US008384240B2

(12) United States Patent
Sato et al.

(10) Patent No.: US 8,384,240 B2
(45) Date of Patent: Feb. 26, 2013

(54) POWER SUPPLY CONTROL DEVICE

(75) Inventors: Chihiro Sato, Hitachinaka (JP); Hirofumi Kurimoto, Hitachinaka (JP)

(73) Assignee: Hitachi Automotive Systems, Ltd., Hitachinaka-shi (JP)

( * ) Notice: Subject to any disclaimer, the term of this patent is extended or adjusted under 35 U.S.C. 154(b) by 383 days.

(21) Appl. No.: 12/856,296

(22) Filed: Aug. 13, 2010

(65) Prior Publication Data

US 2011/0054708 A1 Mar. 3, 2011

(30) Foreign Application Priority Data

Aug. 25, 2009 (JP) ................................ 2009-194632

(51) Int. Cl.
*B60L 1/00* (2006.01)

(52) U.S. Cl. ....... 307/10.1; 307/10.6; 307/9.1; 713/500; 701/468

(58) Field of Classification Search .................. 701/468; 307/9.1, 10.1, 10.6; 713/500
See application file for complete search history.

(56) References Cited

U.S. PATENT DOCUMENTS

| | | | | |
|---|---|---|---|---|
| 5,440,313 | A * | 8/1995 | Osterdock et al. | 342/352 |
| 5,745,741 | A * | 4/1998 | King | 713/500 |
| 8,174,382 | B2 * | 5/2012 | Kilmurray et al. | 340/540 |
| 2005/0285445 | A1 * | 12/2005 | Wruck et al. | 307/10.1 |
| 2008/0203814 | A1 * | 8/2008 | Kamiya | 307/10.1 |
| 2011/0022864 | A1 * | 1/2011 | Haiplik et al. | 713/322 |
| 2011/0163718 | A1 * | 7/2011 | Van Wiemeersch | 320/109 |
| 2012/0029852 | A1 * | 2/2012 | Goff et al. | 702/63 |
| 2012/0179404 | A1 * | 7/2012 | Lee et al. | 702/66 |
| 2012/0200405 | A1 * | 8/2012 | Gafford et al. | 340/438 |

FOREIGN PATENT DOCUMENTS

| | | |
|---|---|---|
| JP | 2005-114585 A | 4/2005 |

* cited by examiner

*Primary Examiner* — Kaitlin Joerger
*Assistant Examiner* — Ernesto Suarez
(74) *Attorney, Agent, or Firm* — Crowell & Moring LLP

(57) ABSTRACT

When a highly accurate clock is received by a GPS radio wave from a GPS antenna, the highly accurate clock is always generated by locking a phase locked loop (PLL) circuit within a hold-over section of a clock control section in a power supply control unit. When the GPS radio wave cannot be received normally, the highly accurate clock depending on the GPS radio wave is set to a self-running condition not depending on a self-oscillation clock from an internal clock generating section and a time management section automatically corrects the present time data obtained when the standard radio wave is received from a radio wave antenna based on the highly accurate clock. A primary voltage generating section continuously generates the highly accurate clock even when an ignition switch is turned OFF by avoiding voltage variation in battery voltages while the ignition switch is turned ON. Accordingly, the power supply control device can sustain highly accurate time correction and a clock function under any environmental condition and can also control and execution of various functions based on accurate time management.

17 Claims, 8 Drawing Sheets

POWER SUPPLY CONTROL DEVICE

BACKGROUND OF THE INVENTION

1. Field of the Invention

The present invention relates to a power supply control device used in an electric control unit (ECU) of electric equipment for a vehicle and more specifically to a power supply control device provided with high precision time correction and clock functions.

2. Description of the Related Art

In recent years, the electric control unit (specially, for automobiles) mounted to a vehicle is provided with a power supply control device for converting an ordinary standard battery voltage of 12V to various voltages of 5V and 3.3V or the like and then supplying these generated voltages to other devices loaded for electric systems such as an microcomputer and various sensors.

This power supply control device is requested to have a function to measure the period in which the engine operation has stopped using a timer circuit provided, a function to run an evapo-leak diagnosis to a fuel tank loaded to the vehicle by activating the microcomputer and various sensors after passage of the specified constant period after the engine operation has stopped, and a function to run a diagnosis for various temperatures during passage of the time in which the engine operation has stopped. Particularly, in the case of an electric vehicle, the power supply control device is requested to provide a function to administrate the present time, because it is required that the battery is charged after the vehicle has learned, for the charging of battery, that the electricity charges are lowered at the midnight hours and a driver (owner, user) uses the vehicle less during such a period.

Moreover, the electric control unit is also requested to provide a function to compute life-time of the vehicle or learn running conditions and a using period. In addition, it is also requested to have a function to collect and record failure occurring time and period.

As the prior art of providing the time management function to satisfy the requirements explained above, it is possible to list up, for example, a control unit with time correcting function (refer to Japanese Patent Application Laid-Open Publication No. 2005-114585) providing a section that computes life-time of the vehicle, automatically correcting the time, and always recognizing the highly accurate absolute time.

In the control unit with time correcting function of Japanese Patent Application Laid-Open Publication No. 2005-114585, a timer circuit having the function to generate a clock utilizing charging and discharging of a capacitor is provided within a power supply control device (control device) to constitute a section that corrects time management by receiving time data from the standard radio wave as a section that recognizes the accurate absolute time.

However, in the case of this function structure, if there is an obstacle in an underground parking lot and garage while a vehicle is parked, it is no longer possible to normally receive the standard radio wave. In this case, the accurate clock for measuring the present time and the period while the engine operation is stopped cannot be acquired. As a result, the highly accurate time correcting and clock functions cannot be maintained, resulting in problems that control and execution of various functions based on the accurate time management are disabled.

The present invention has been proposed to solve the problems described above and a technical subject of the present invention lies in providing a power supply control device for maintaining highly accurate time correction and clock functions and actualizing control and execution of various functions based on accurate time management under any application environment.

SUMMARY OF THE INVENTION

In view of solving the technical subject explained above, according to an aspect of the basic structure of the power supply control device in the present invention, there is provided a power supply control device used in the electric control unit of electric equipment for a vehicle and including a voltage generating section that generates voltages used at least for a signal process for clocks required in electric devices included in the electric equipment for vehicles and a data process for backup storage from a battery voltage connected eternally, the power supply control device including a reference voltage generating section as a voltage generating section that generates a reference voltage from the battery voltage supplied when an ignition switch is turned ON, a primary voltage generating section as the voltage generating section that generates a primary voltage from the battery voltage, a secondary voltage generating section as the voltage generating section that generates a secondary voltage from the primary voltage, an internal clock generating section that generates an internal clock signal, a GPS receiving section that receives a GPS radio wave, a clock extracting section that extracts a GPS clock signal from the GPS radio wave, a clock monitoring section that monitors the GPS clock signal, a clock switching section that selects the internal clock signal and the GPS clock signal, an hold-over section that self-maintains clock accuracy to the selected signal of the internal clock signal and the GPS clock signal, a time management section that measures and administrates the time, a radio wave receiving section that receives the standard radio wave including the reference time data, an ignition key off time measuring section that measures ignition key off time, and a voltage application control section that applies the secondary voltage to the electric devices during the setting period of the ignition key off and stop again application of the relevant secondary voltage after passage of a stop period set after activation of the relevant electric devices, wherein the time management section has a time correcting function to correct the time data of the standard radio wave based on the clock accuracy self-maintained with the hold-over section.

In view of solving the technical subject explained above, according to another aspect of the basic structure of the power supply control device in the present invention, there is provided a power supply control device used in the electric control unit of electric equipment for a vehicle and including a voltage generating section that generates voltages used at least for a signal process for clocks required in electric devices included in the electric equipment for vehicles and a data process for backup storage from a battery voltage connected eternally, the power supply control device including a reference voltage generating section that generates a reference voltage from the battery voltage connected eternally, a primary voltage generating section that generates a primary voltage during an ON period of an ignition switch based on the battery voltage connected, a secondary voltage generating section that generates a secondary voltage from the primary voltage, an internal clock generating section that generates an internal clock signal, a GPS receiving section that receives a GPS radio wave, a clock extracting section that extracts a GPS clock signal from the GPS radio wave, a clock monitoring section that monitors the GPS clock signal, a clock switching section that selects the internal clock signal and the GPS clock signal, a hold-over section that self-maintains clock accuracy to the selected signal of the internal clock signal and the GPS clock signal, a time management section that measures and administrates the time, a radio wave receiving section that receives the standard radio wave including the reference time data, an ignition key off time measuring section that measures ignition key off time, and a voltage application control section that applies the secondary voltage to the electric devices during a setting period of the ignition key off and stop again application of the relevant secondary voltage after passage of a stop period set after activation of the relevant electric devices, wherein the time management section has a time correcting function to correct the time data of the standard radio wave based on the clock accuracy self-maintained with the hold-over section.

According to a profile of the power supply control device in the present invention, since the time management function is provided for always generating highly accurate clock by locking a phase-locked loop (PLL) within the device when highly accurate clock is received from the GPS radio wave, allowing self-running of the highly accurate clock not belonging to the self-oscillation clock due to generation of the internal clock but belonging to the GPS radio wave when the GPS radio wave cannot be received normally due to an obstacle, and moreover automatically correcting the present time data obtained by receiving the standard radio wave based on the generated highly accurate clock, highly accurate time correction and clock functions can always be maintained under any application environment, and control and execution of various functions can be activated on the basis of accurate time management. As a result, a function to measure ignition switch off time can be executed based on highly accurate time management by always recognizing, for example, the absolute time. Moreover, various functions provided to an electric control unit can also be executed based on highly accurate time management by generating voltages supplied to a microcomputer and various sensors after passage of time set after stop of engine operation from turning off of the ignition switch. Accordingly, it is possible to effectively carry out computation of a life time of a vehicle, learning of a life style of a vehicle driver (owner, user), detection of failures in various sensors and loaded devices during the ignition switch off period, and charging of battery, etc. More concretely, it is possible for a vehicle driven by an engine to effectively activate the function to measure the engine stop period, the function of evapo-leak diagnosis of a fuel tank loaded to the vehicle after activating the microcomputer and various sensors after passage of the specified constant time after stop of the engine operation, and the function to conduct diagnosis to various temperatures after passage of the engine stop period. In addition, for an electric vehicle which requires plug-in type charging of battery from a home receptacle, it is possible to effectively activate the function to learn the life style of a driver (owner, user) from the time used for driving of the vehicle and thereby it is also possible to effectively utilize the function to execute charging of the battery when the vehicle is not used and at the midnight hours when electricity charges are lower in accordance with the time to use the vehicle and the running distance of a vehicle.

BRIEF DESCRIPTION OF THE DRAWINGS

Embodiments of the present invention will be described in detail based on the following figures, wherein.

DESCRIPTION OF THE PREFERRED EMBODIMENTS

The power supply control device of the present invention will be explained below on the basis of some preferred embodiments with reference to the accompanying drawings.

First Embodiment

Figure 1:
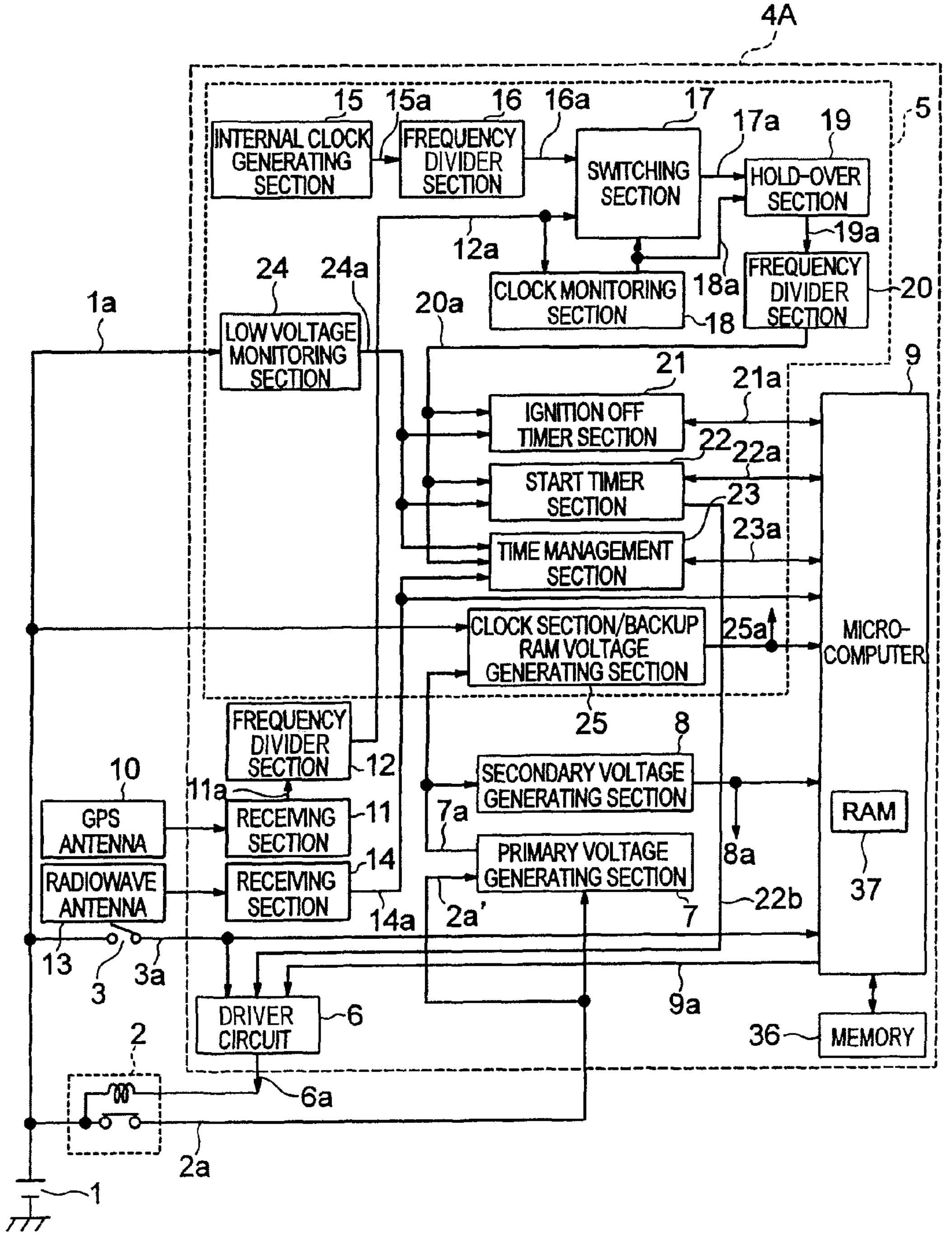
FIG. 1 is a circuit diagram showing a basic structure of a power supply control device as a first embodiment of the present invention.

FIG. 1 is a circuit diagram showing a basic structure of the power supply control device as a first embodiment of the present invention. Here, the power supply control device of the present invention is used in an electric control unit (ECU) to be mounted to electric equipment loaded to a vehicle. This power supply control device is required to activate a microcomputer, when various voltages (at least the voltages used for signal process for clock and data process for backup storage) required for electric devices included in the electric equipment for a vehicle from a battery voltage with operation of an ignition switch are generated, to activate the function of periodical diagnosis such as the evapo-purge system by generating a stable voltage even if the battery voltage is varied at the time of starting the engine or if loading effect appears and in addition after passage of the preset time from off manipulation of the ignition switch and the function to charge the battery with the plug-in method at the time such as the midnight hours resulting in less frequent usage of the vehicle.

The power supply control device as the first embodiment of the present invention includes a power supply control unit 4A as the principal section and is also provided with a main relay 2 and an ignition switch 3 between this power supply control unit 4A and a battery 1 through branching connection. In addition, this power supply control device of the present invention also includes a radio wave antenna 13 as the radio wave receiving section that receives the standard radio wave including the present time as the standard time and a GPS antenna 10 as the GPS receiving section that receives the GPS radio wave as the additional sections of the power supply control unit 4A.

An internal structure of the power supply control device 4A is constituted with a receiving section 11 connected to the GPS antenna 10, a receiving section 14 connected to the receiving antenna 13, a frequency divider section 12 connected to the receiving section 11, a primary voltage generating section 7 connected to the main relay 2, a secondary voltage generating section 8 connected to the primary voltage generating section 7, a microcomputer 9 connected to the secondary voltage generating section 8 and the ignition switch 3, a driver circuit 6 connected to the ignition switch 3, microcomputer 9, and main relay 2, and a clock control section 5 to receive a battery voltage 1*a* applied from the battery 1 and is connected with the frequency divider section 12, receiving section 14, primary voltage generating section 7, secondary voltage generating section 8, and microcomputer 9.

Of the various sections explained above, the clock control section 5 is formed to include a low voltage monitoring section 24 to which the battery voltage 1*a* is applied, an ignition off timer section 21 connected to the low voltage monitoring section 24 and microcomputer 9, a start timer section 22 connected to the low voltage monitoring section 24, microcomputer 9, and driver circuit 6, a time management section 23 connected to the low voltage monitoring section 24, microcomputer 9, and receiving section 14, a clock section/backup RAM voltage generating section 25 to receive the applied battery voltage 1*a* and primary voltage 7*a* and connected to the microcomputer 9, an internal clock generating section 15, a frequency divider section 16 connected to the internal clock generating section 15, a switching section 17 connected to the frequency divider section 16 and receiving section 14, a clock monitoring section 18 connected to the frequency divider section 16, receiving section 14, and switching section 17, a hold-over section 19 connected to the switching section 17 and clock monitoring section 18, and a frequency divider section 20 connected to the hold-over section 19, ignition off timer section 21, start timer section 22, and time management section 23.

Operation processes of each section forming the internal structure of the power supply control unit 4A will be explained hereunder. When the ignition switch 3 is turned ON, the battery voltage 1*a* supplied from the other end side (negative side) of the battery 1 with the one end side (positive side) connected to the ground is sent to the driver circuit 6 as an ignition switch signal 3*a* when contacts of the ignition switch 3 are in the ON condition (closing condition). In the driver circuit 6, when the ignition signal 3*a* is inputted, a relay drive signal 6*a* is outputted to the main relay 2 in the high level condition to drive the main relay 2 setting the relay contacts to the ON condition (closing condition). In this timing, when the relay contacts of main relay 2 are in the ON condition, a battery voltage 2*a* of the other system is branched and it is partially applied (transmitted) to the primary voltage generating section 7 as a primary voltage control signal 2*a*'. Here, the primary voltage control signal 2*a*' is used as a start control signal of the primary voltage generating section 7.

The primary voltage generating section 7 generates a primary voltage 7*a* through application of a circuit structure of the type introducing, for this purpose, voltage boost/down conversion or voltage down conversion system. If the battery voltage 2*a* is requested to secure operation under the voltage equal to or lower than the primary voltage 7*a* generated by the primary voltage generating section 7 (for example, in the case where momentary down of voltage up to 4.5V occurs due to the cranking on the occasion of starting the engine), the voltage boost/down conversion type circuit structure is introduced.

Figure 2:
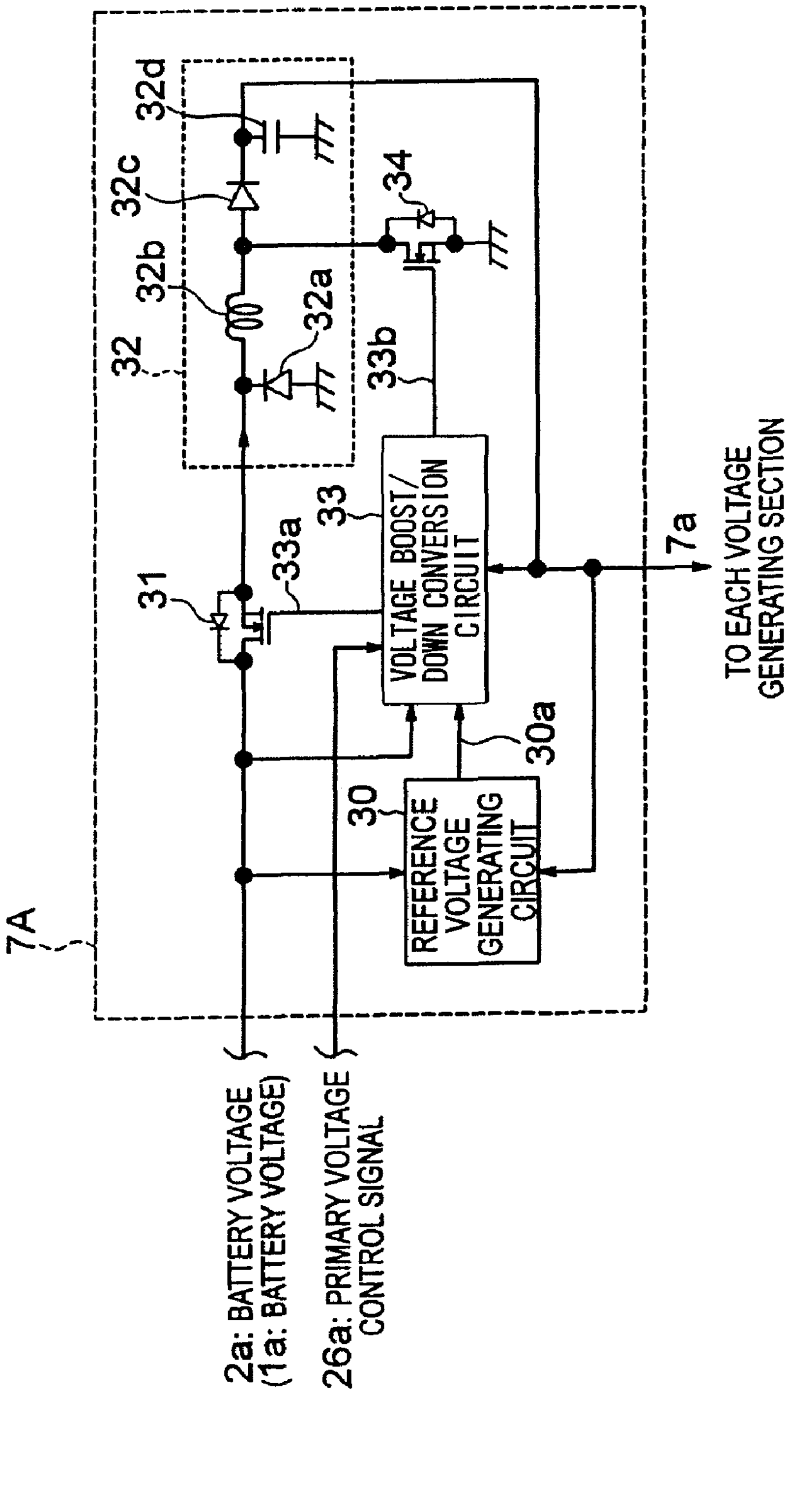
FIG. 2 is a voltage boost/down conversion primary voltage generating circuit as an example of a primary voltage generating section provided in the power supply control device shown in FIG. 1.

FIG. 2 shows a voltage boost/down conversion primary voltage generating circuit 7A as an example of the primary voltage generating section 7.

This voltage boost/down conversion primary voltage generating circuit 7A includes a voltage boost/down conversion circuit 33 to receive an applied battery voltage 2*a* and to be started when a high level primary voltage control signal 26*a* is applied. The voltage boost/down conversion circuit 33 generates a stabilized primary voltage 7*a* via a smoothing circuit 32 provided in the succeeding stage by driving a switching element 31 to down the voltage with a voltage down conversion signal 33*a* when the battery voltage 2*a* is equal to or higher than the predetermined voltage with criterion of the reference voltage 30*a* generated by a reference voltage generating circuit 30 from the higher voltage selected from the battery voltage 2*a* and the primary voltage 7*a* of the primary voltage control signal 26*a*. The smoothing circuit 32 is formed by connecting an inductance 32*b* and a diode 32*c* between a diode 32*a* with the one end side connected to the ground and the other end side of a smoothing capacitor 32*d*.

Moreover, the voltage boost/down conversion circuit 33 drives, when the battery voltage 2*a* is lower than the preset voltage, a switching element 34 for voltage boost connected between the inductance 32*b* and diode 23*c* of the smoothing circuit 32 with a voltage boost control signal 33*b* and also drives a switching element 31 for voltage down with a voltage down conversion signal 33*a* in order to generate the stabilized primary voltage 7*a* via the smoothing circuit 32 provided in the succeeding stage. For instance, the primary voltage 7*a* can be set to 4.5V, in this example, when the battery voltage 2*a* is 12V. The primary voltage generating section 7 has a voltage boost/down function including a function to generate the primary voltage by down converter of the battery voltage and a function to generate the primary voltage by boost converter of the battery voltage.

Meanwhile, the voltage down conversion type circuit structure is used when operation is required under the battery voltage 2*a* equal to or higher than the primary voltage 7*a* generated by the primary voltage generating section 7.

Figure 3:
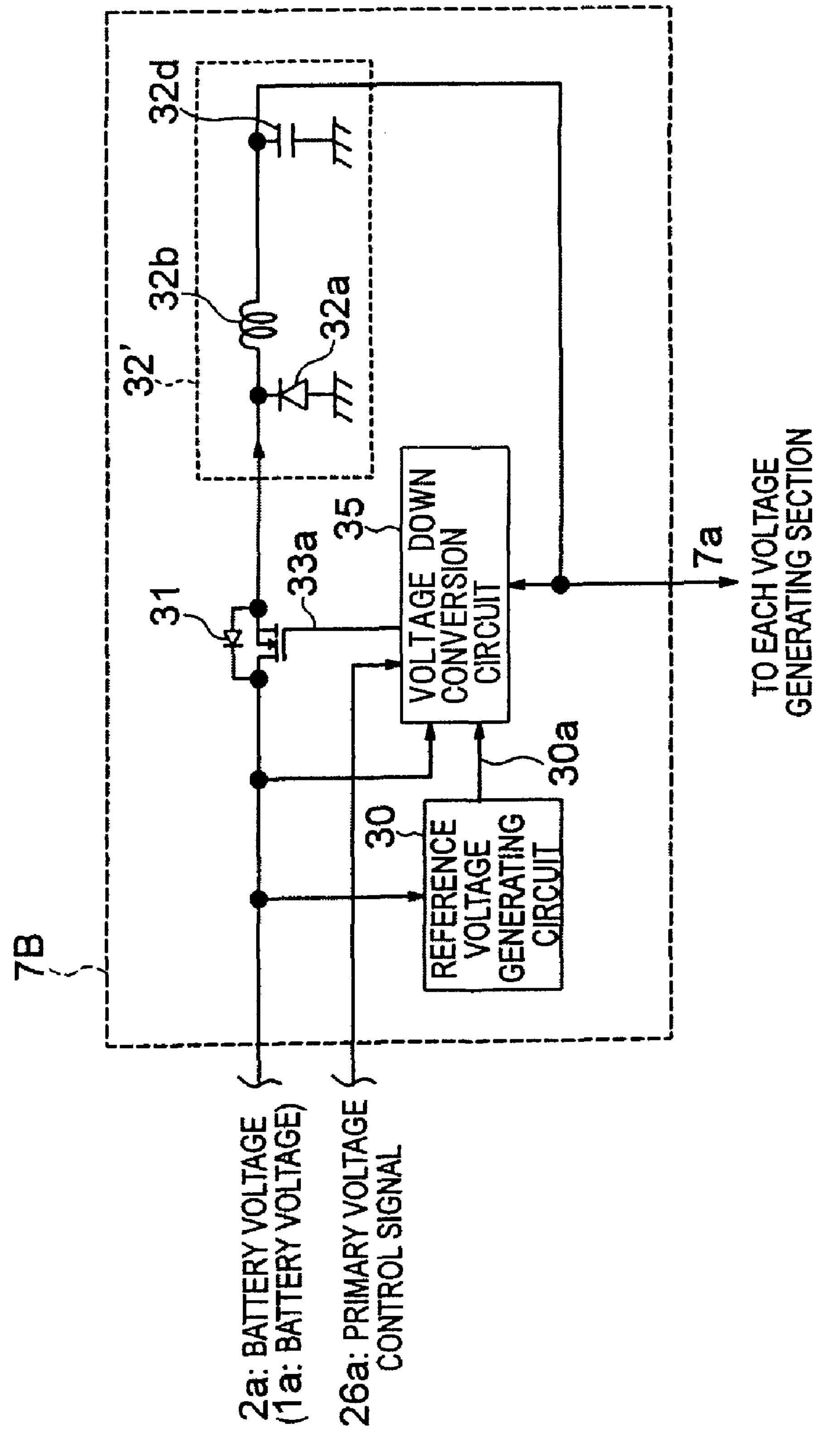
FIG. 3 is a voltage down conversion primary voltage generating circuit as another example of the primary voltage generating section provided in the power supply control device shown in FIG. 1.

FIG. 3 is a voltage down conversion primary voltage generating circuit 7B as another example of the primary voltage generating section 7.

This voltage down conversion primary voltage generating circuit 7B includes a voltage down conversion circuit 35 to receive the applied battery voltage 2*a* and to be started when the high level primary voltage control signal 26*a* is applied. The voltage down conversion circuit 35 drives the switching element 31 for voltage down with the voltage down conversion signal 33*a* to generate the stabilized primary voltage 7*a* via the smoothing circuit 32' provided in the succeeding stage when the battery voltage 2*a* is equal to or higher than the preset voltage with criterion of the reference voltage 30*a* generated by the reference voltage generating circuit 30 from the battery voltage 2*a*. The smoothing circuit 32' is formed by connecting the inductance 32*b* between the diode 32*a* with the one end side connected to the ground and the other end side of the smoothing capacitor 32*d*. For instance, the primary voltage 7*a* is set to 6.0V in this example when the battery voltage 2*a* is 12V.

The primary voltage 7*a* generated by the primary voltage generating section 7 in one of the voltage boost/down conversion primary voltage generating circuit 7A and voltage down conversion primary voltage generating circuit 7B is applied to the secondary voltage generating section 8. The secondary voltage generating section 8 generates the secondary voltage 8*a* from the primary voltage 7*a* and supplies this voltage to the microcomputer 9, various devices and various sensors for activation of these devices.

The microcomputer 9 started by the secondary voltage 8*a* is capable of detecting conditions of the ignition switch 3 and outputs the high level driver control signal 9*a* to the driver circuit 6 in order to prevent occurrence of a failure due to stop of operation of the primary voltage generating section 7 in operation of the ignition switch 3 during the processes of the software. The driver circuit 6 then outputs a high level relay drive signal 6*a* to the main relay 2 for maintaining the driving condition of the main relay 2 to continuously keep the ON condition of the relay contacts. As a result, the battery voltage 2*a* can be applied continuously for continuation of operation of the primary voltage generating section 7.

When the ignition switch 3 is turned OFF, the microcomputer 9 completes processes of the software and outputs the low level driver control signal 9*a* to the driver circuit 6 which in turn outputs the low level relay drive signal 6*a* to the main relay 2 for turning OFF the relay contacts by cancelling the driving condition of the main relay 2. Thereby, application of the battery voltage 2*a* is shut off in order to stop operation of the primary voltage generating section 7.

Upon reception of a GPS signal from the GPS antenna 10, the receiving section 11 connected to this antenna extracts a highly accurate GPS receiving clock signal 11*a*. The frequency divider section 12 outputs a GPS clock signal 12*a* with frequency division of the GPS receiving clock signal 11*a*.

Upon reception of the standard radio wave from the radio wave antenna 13, the receiving section 14 connected to this antenna 13 outputs a time signal 14*a* showing the time data included in the standard radio wave.

Operation control for each section in relation to the battery voltage 2*a* via the main relay 2 explained above can realize suppression of current consumption (power consumption) by actualizing operation only when the ignition switch 3 is operated in order to prevent power consumption from the battery 1.

Moreover, regarding the battery voltage 1*a* eternally connected not via the main relay 2 explained above, the clock section/backup RAM voltage generating section 25 within the clock control section 5 generates a clock section/backup RAM voltage 25 from a higher voltage of the primary voltage 7*a* and the battery voltage 1*a* and the generated voltage 25*a* is then applied to the internal clock generating section 15, microcomputer 9, ignition off timer section 21, start timer section 22 and time management section 23 to generate the internal clock signal 15*a*, carry out operation of various timer sections and store the data of the backup RAM 37 mounted to the microcomputer 9 in order to prevent momentary down of the battery voltage 1*a* by cranking at the time of starting ignition when each section constituting the clock control section 5 within the power supply control unit 4A is operated.

In the clock control section 5, the frequency divider section 16 divides the frequency of the internal clock signal 15*a* generated by the internal clock generating section 15 to generate a self-oscillation clock signal 16*a*. The self-oscillation clock signal 16*a* and the GPS clock signal 12 of the GPS system are inputted to the switching section 17; but receiving condition of the GPS clock signal 12*a* is monitored by the clock monitoring section 18 which transmits a clock switching signal 18*a* to the switching section 17. As a result, the switching section 17 outputs a clock selection signal 17*a* having selected one of the self-oscillation clock signal 16*a* and the GPS clock signal 12*a* to the hold-over section 19.

The hold-over section 19 locks an internal phase lock loop (PLL) circuit following the clock selection signal 17*a* and outputs a locked hold-over output clock signal 19*a* to the frequency divider section 20. This frequency divider section 20 divides the frequency of the hold-over output clock signal 19*a* and outputs a high precision clock signal 20*a* in the frequency of 1 Hz.

However, the hold-over section 19 stops, unless a certain problem occurs in the receiving condition of the GPS radio wave owing to the monitoring function of the clock monitoring section 18, the process depending on the clock selection signal 17*a* using the clock switching signal 18*a* outputted from the clock monitoring section 18 even when the GPS clock signal 12*a* can be acquired after the hold-over output clock signal 19*a* is generated based on the clock selection signal 17*a* related to the GPS clock signal 12*a* (generation of clock depending on lock of the GPS clock) and self-holds accuracy of the clock being locked by operation of the internal phase lock loop (PLL) circuit which has already been in the dependant processing condition. For instance, under the emergency condition where a problem occurring in the receiving condition of the GPS radio wave continues for a longer period or the initial condition at the time of delivery where the GPS radio wave is not received, the hold-over section 19 generates the hold-over output clock signal 19*a* based on the clock selection signal 17*a* related to the internal clock signal 15*a* and self-holds the clock accuracy being locked with operation of the phase lock loop (PLL) circuit. However, under the operating condition by a user, the clock accuracy almost based on the GPS clock can be self-held.

Namely, with actualization of the functions explained above, a highly accurate clock depending on the GPS clock can be generated by realizing operation with the clock function depending on the internal clock in the case where the GPS clock cannot be extracted accurately from the GPS radio wave under the condition of delivery from a manufacturing factory and then switching the operating condition to extraction and selection of the GPS clock when it has become possible to extract the GPS clock from the GPS radio wave under the operating condition by a user after delivery from the factory.

The ignition off timer section 21 operates as the ignition key off time measuring section that measures ignition key off time to start the counting operation based on the highly accurate clock signal 20*a* by inputting the ignition off timer control signal 21*a* outputted when the microcomputer 9 recognizes off data of the ignition switch 3 from the ignition switch signal 3*a* and to stop the counting operation when the ignition switch 3 is turned ON again.

Since passage of time where the ignition switch 3 is turned OFF is outputted, as the ignition off timer control signal 21*a*, to the microcomputer 9 from the counted value data, the microcomputer 9 is capable of detecting off time of the ignition switch 3.

The start timer section 22 operates as the start timer section used to start the mounted electric equipment after passage of time preset when the ignition switch 3 is turned OFF in order to set the start and stop times of the ignition switch 3 to be instructed from the microcomputer 9 after passage of the preset time from the off manipulation.

The start timer section 22 starts the counting operation from the count value "1" based on the highly accurate clock signal 20*a* by inputting the start timer control signal 22*a* outputted from the microcomputer 9 when it recognizes the off data of the ignition switch 3 from the ignition switch signal 3*a* and also outputs a high level start control signal 22*b* after the count value has exceeded the time preset by the microcomputer 9.

Thereafter, the driver circuit 6 drives the main relay 2 with a high level relay drive signal 6*a* to turn ON the relay contacts. As a result, the battery voltage 2*a* is applied to the primary voltage generating section 7, and various voltages are moreover generated because the primary voltage 7*a* generated by the primary voltage generating section 7 is applied to the secondary voltage generating section 8 to start the microcomputer 9 and various sensors schematically illustrated. In addition, it is possible to run a diagnosis and charging operation of various electric devices mounted in the vehicle.

Moreover, the start timer section 22 cancels, after the stop time preset by the microcomputer 9 has passed, drive of the main relay 2 by controlling the start control signal 22*b* to the low level in order to prevent consumption of the battery voltages 1*a*, 2*a* due to continuation of operation of the power supply control device in case the microcomputer 9 is not started because of occurrence of a failure after the start control signal 22*b* is outputted in the high level condition. In such a case, the start timer section 22 counts up again the counting operation from the count value "1" and repeatedly controls the start control signal 22*b* after passage of the preset period.

The ignition off timer section 21 and start timer section 22 explained above respectively have the function to make circuit operation valid/invalid with individual control from the microcomputer 9.

The time management section 23 executes internal time management on the basis of the highly accurate clock signal 20*a* and has the time correcting function to correct the present time data included in the present time signal 14*a* of the standard radio wave system based on high clock accuracy.

Under the condition that the time management data corrected by the time management section 23 is outputted to the microcomputer 9 as the time control signal 23*a*, the microcomputer 9 can recognize this time management data and detect the counting result of the built-in timer for comparison of both time management data. Accordingly, the time management section 23 can be diagnosed whether it is operating normally or not. If the time management section 23 is not operating normally, it is possible to make the microcomputer 9 output the time management data as the time control signal 23*a* to the time management section 23 to store this time management data therein.

A diagnosis of the ignition off timer section 21 and start timer section 22 can be run with the processes: when the ignition switch 3 is turned OFF, the microcomputer 9 stores the time management data to a non-volatile memory 36 provided and a built-in backup RAM 37; when the ignition switch is turned ON again, the time management data of the time management section 23 and the time management data stored in the non-volatile memory 36 and backup RAM 37 are used; and a time difference between the time management data is compared with the count values of the ignition off timer section 21 and start timer section 22 in order to detect whether these are matched or not. As a result, it becomes possible to diagnose whether these circuits are operated normally or not. If a failure occurs in these internal circuits, a connected load or the like, contents of the failure can be stored together with the time data such as failure occurring period in the non-volatile memory 36 and backup RAM 37.

In addition, since the ignition off timer section 21 and start timer section 22 can provide the functions under the control from the microcomputer 9 even when the ignition switch 3 is turned ON, it is possible to run a diagnosis on these circuits. Accordingly, a still further highly reliable power supply control device can be provided by preparing for various diagnostic functions.

Namely, diagnosis for functions of the time management section 23, ignition off timer section 21, and start timer section 22 is possible under the control of the microcomputer 9. In addition, the ignition off timer section 21 and start timer section 22 respectively have the function to start the counting operation from "1" when these timers are set effective under the control of the microcomputer 9. Moreover, the start timer section 22 has the function to activate the primary voltage generating section 7 after passage of the start time with setting of the start time and stop time from the microcomputer 9, stop again the primary voltage generating section 7 after passage of the stop time thereof, and start again operation of the counter.

Furthermore, in view of maintaining normal circuit operation of the ignition off timer section 21, start timer section 22, and time management section 23 explained above, control is carried out to monitor the battery voltage 1*a* with the low voltage monitoring section 24, to transmit a power on reset signal 24*a* to each section when a lower voltage is generated or the battery 1 is disconnected, and to prevent occurrence of a failure in the timer value by initializing the circuit of each section.

The non-volatile memory 36 connected to the microcomputer 9 can electrically write and store the function diagnostic data of the time management section 23, ignition off timer section 21, and start timer section 22. The microcomputer 9 is provided with the backup RAM 37 that is formed as the volatile memory for backup of the function diagnostic data. The function diagnosis is run when the microcomputer 9 is started after passage of the preset time from the timing when the ignition switch 3 is turned ON or OFF.

Moreover, the microcomputer 9 in this power supply control device has the functions to instruct the backup RAM 37 and non-volatile memory 36 to store the vehicle producing time on the basis of the present time data obtained from the time management section 23, to administrate and diagnose the time to store the data to the backup RAM 37 and non-volatile memory 36, to avoid deletion of data when the battery is exchanged, and to compute difference between the present time and vehicle producing time.

Moreover, the microcomputer 9 has the additional functions to instruct the backup RAM 37 and non-volatile memory 36 to store the usage condition of a vehicle of a driver based on the present time data from the time management section 23 and a result of measurement by the ignition off timer section 21 and to learn the life style of the driver by computing starting time of usage and using time of the vehicle. In addition, the microcomputer 9 is provided with the function to instruct the backup RAM 37 and non-volatile memory 36 to store the data of a failure occurring in the loading condition in the circuits of the electric devices and the devices connected to these circuits and the time data of such failure on the basis of the present time data sent from the time management section 23.

Figure 4:
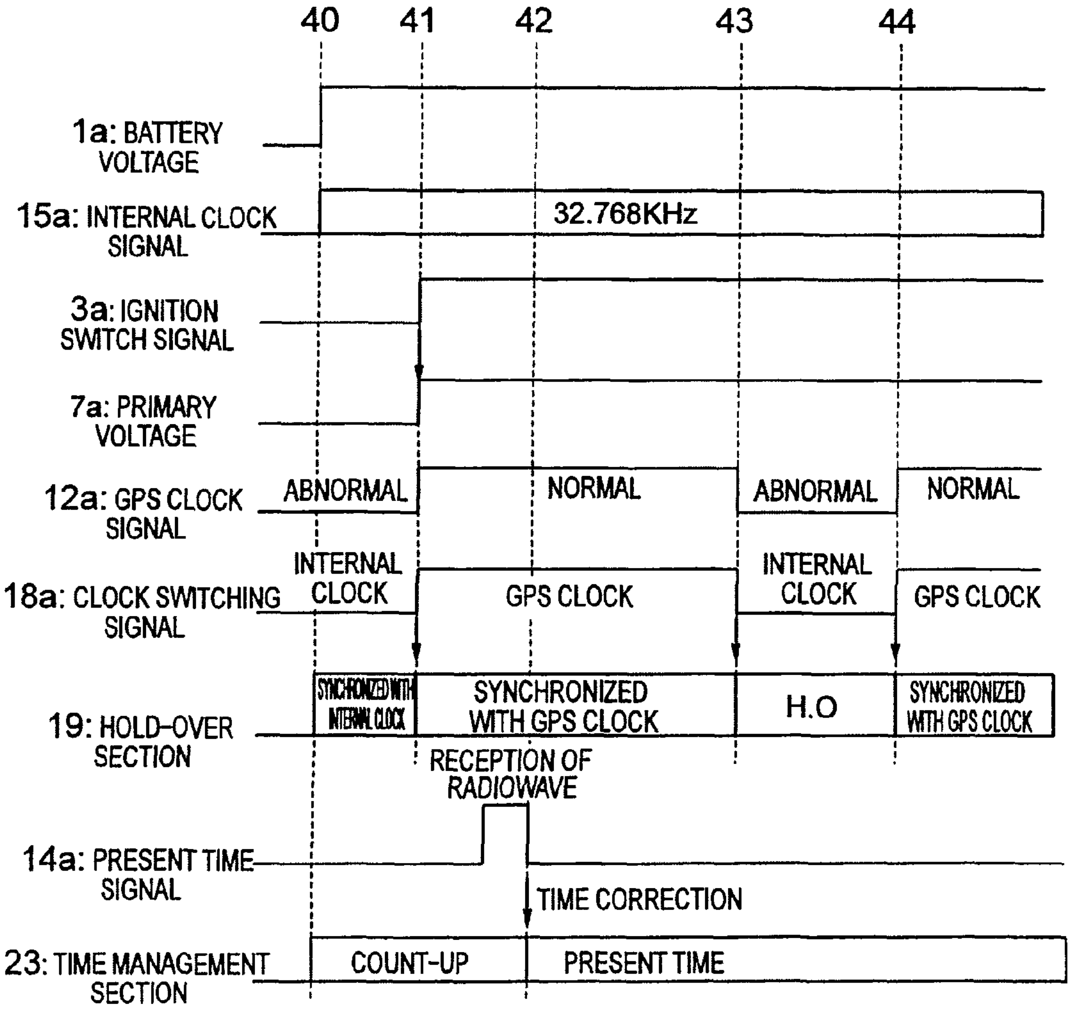
FIG. 4 is a timing chart of signal waveforms for signal processes in each section for explaining clock operating function of a power supply control unit forming an essential part of the power supply control device shown in FIG. 1.

FIG. 4 is a timing chart of signal waveforms in relation to signal processes of each section shown for explaining the clock operating function (mainly related to the clock control section 5) of the power supply control unit 4A.

Here, when the battery 1 is connected and the battery voltage 1*a* is applied to the clock control section 5 in the timing of time 40, the internal clock section 15 in the clock control section 5 generates the internal clock signal at the frequency of 32.768 kHz for the internal clock. Since no voltage is applied to the receiving section 11 connected to the GPS antenna 10, the GPS clock signal 12*a* extracted from the GPS radio wave changes to an abnormal signal. Thereby, the clock switching signal 18*a* generated by the clock monitoring section 18 changes to a low level output, the self-oscillation clock signal 16*a* attained by dividing the frequency of the internal clock signal 15*a* sent from the internal clock generating section 15 with the frequency divider section 16 is selected in the switching section 17 as the clock selection signal 17*a*, and the hold-over section 19 outputs the hold-over output clock signal 19*a* synchronized with the selected internal clock. The hold-over output clock signal 19*a* is divided in the frequency with the frequency divider section 20 and is then outputted, as the highly accurate clock signal 20*a*, to each section requiring management of time and starting operation.

When the ignition switch 3 is turned ON in the timing of time 41, the ignition switch signal 3*a* rises to the high level from the low level. Simultaneously, the relay drive signal 6*a* of the driver circuit 6 changes to the high level to drive the main relay 3. Thereby, the relay contacts are turned ON. Here, the battery voltage 2*a* is applied to the primary voltage generating section 7 and the primary voltage 7*a* is generated in the primary voltage generating section 7. Therefore, the secondary voltage 8*a* is generated from the primary voltage 7*a* generated by the secondary voltage generating section 8 and this secondary voltage 8*a* is applied to the microcomputer 9 and each section (including various sensors) of the other devices to start each section of these devices.

When a voltage is applied to the receiving section 11 connected to the GPS antenna 10, a signal can be received from the GPS antenna 10 and the receiving section outputs the GPS receiving clock signal 11*a* extracted from the GPS radio wave. Therefore, the GPS clock signal 12*a* divided in the frequency with the frequency divider section 12 changes the normal signal. Thereby, the clock switching signal 18*a* generated by the clock monitoring section 18 changes to the high level output signal. In the switching section 17, the GPS clock signal 12*a* is selected as the clock selection signal 17*a*. Meanwhile, the hold-over section 19 outputs the hold-over output clock signal 19*a* synchronized with the selected GPS clock. The hold-over output clock signal 19*a* is divided in the frequency by the frequency divider section 20 and is outputted, as the high precision clock signal 20*a*, to each section requiring management of time and driving operation.

When the receiving section 14 connected to the radio wave antenna 13 outputs the present time signal 14*a* showing the present time data using the receiving data of the standard radio wave to the time management section 23 in the timing of the time 42, the time management section 23 corrects the present time data of the present time signal 14*a* to the present time based on the highly accurate clock signal 20*a*. Here, time management is conducted based on the highly accurate clock extracted from GPS.

Moreover, at the timing of time 43 in the case where the GPS clock can no longer be extracted from the GPS radio wave sent from the GPS antenna 10 due to an obstacle while the vehicle is running, the clock monitoring section 18 can determine abnormal condition of the GPS clock signal 12*a* from GPS. Accordingly, the clock switching signal 18*a* generated by the clock monitoring section 18 changes to a low level output and the switching section 17 selects, as the clock selection signal 17*a*, the self-oscillation clock signal 16*a* attained by dividing the frequency of the internal clock signal 15*a* supplied from the internal clock generating section 15 with the frequency divider section 16 and outputs this selected signal to the hold-over section 19. However, since operation of the internal phase locked loop (PLL) circuit is once locked through synchronization with the GPS clock, the hold-over section 19 does not allow the process depending on the self-oscillation clock signal 16*a*, maintains the process depending on the GPS clock (hold-on H.O) by the internal phase locked loop (PLL) circuit, and outputs the hold-over output clock signal 19*a* holding the highly accurate clock condition. The hold-over output clock signal 19*a* is divided in the frequency with the frequency divider section 20 and is then outputted as the highly accurate clock signal 20*a* to each section requiring management of time and starting operation.

The GPS clock signal 12*a* returns to the normal condition in the timing of time 44 in which the GPS clock can be extracted from the GPS radio wave (the GPS radio wave can be received normally) through the GPS antenna 10. Therefore, the clock switching signal 18*a* generated by the clock monitoring section 18 changes to the high level signal, the switching section 17 selects the GPS clock signal 12*a* as the clock selection signal 17*a*, and the hold-over section 19 executes again the depending process to output the hold-over output clock signal 19*a* synchronized with the GPS clock selected again. The hold-over output clock signal 19*a* is divided in the frequency by the frequency divider section 20 and is then outputted as the highly accurate clock signal 20*a* to each section requiring management of time and starting operation.

Figure 5:
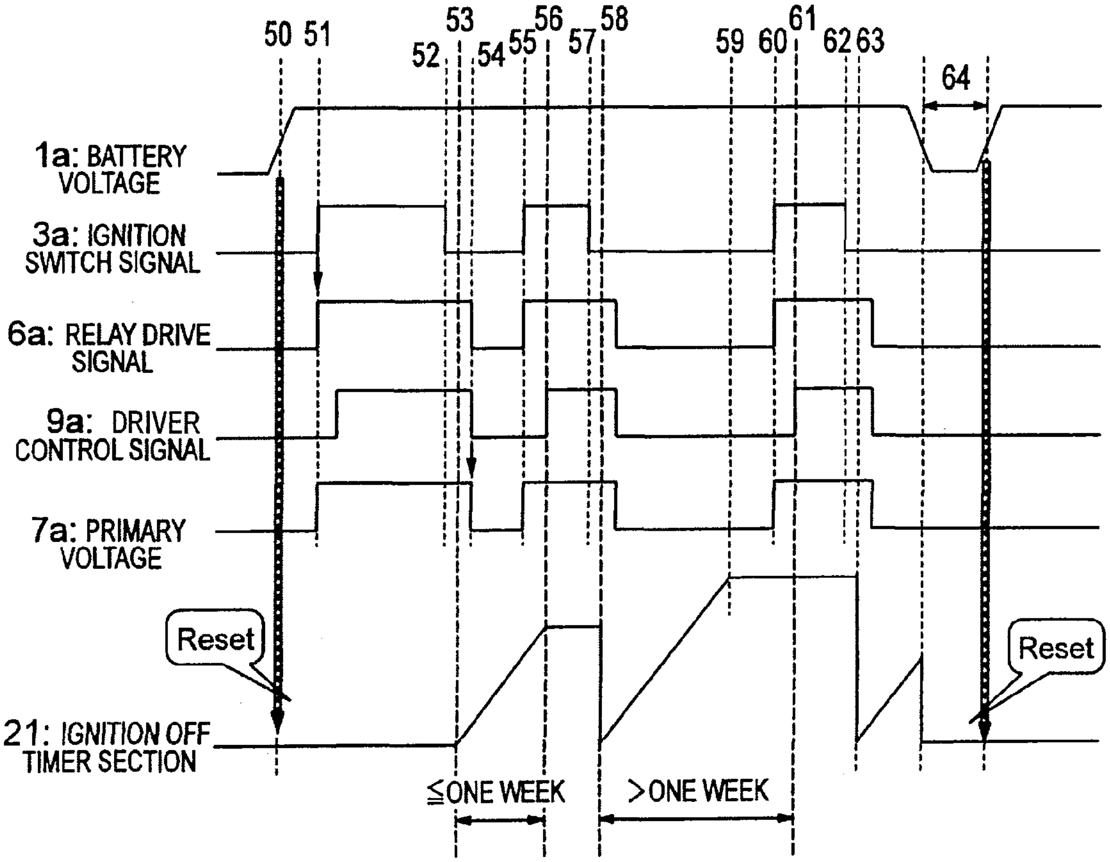
FIG. 5 is a timing chart of signal waveforms for signal processes in each section for explaining operating function of an ignition off timer section provided in the power supply control unit explained in FIG. 4.

FIG. 5 is a timing chart of signal waveforms in relation to signal processes in each section shown for explaining operating functions of the ignition off timer section 21 provided in the clock control section 5 of the power supply control unit 4A. The count values set here in the ignition off timer section 21 are values obtained from an example of measurements continued for a week because the life style of a person can be established with repetition of behaviors in unit of one week in view of learning using condition of a vehicle driver (owner, user).

In the case where the battery 1 is connected and the battery voltage 1*a* is applied to the clock control section 5 in the timing of time 50, the counter values of the ignition off timer section 21 are completely reset to the initial value "0" within the clock control section 5.

When the ignition switch 3 is manipulated to the ON condition in the timing of time 51, the ignition switch signal 3*a* changes to high level from low level. Simultaneously, the relay drive signal 6*a* of the driver circuit 6 changes to the high level signal to drive the main relay 3 through the relay by turning ON the contacts thereof. As a result, the battery voltage 2*a* is applied to the primary voltage generating section 7 to generate the primary voltage 7*a*. Accordingly, the secondary voltage 8*a* is generated from the primary voltage 7*a* generated by the secondary voltage generating section 8 and this secondary voltage 8*a* is applied to the microcomputer 9 and the other sections (including various sensors not shown in the figure) to start these sections.

In order to prevent occurrence of a failure due to stop of the primary voltage 7*a* caused by manipulation of the ignition switch 3 during the operation, the microcomputer 9 controls the operation to keep the ON condition of the relay contacts of the main relay 2 by outputting the driver control signal 9*a* changed to the high level to the driver circuit 6 to maintain the ON condition of the relay contacts of the main relay 2 by boosting the relay drive signal 6*a* from the driver circuit 6 to the high level condition.

When the ignition switch 3 is manipulated to the OFF condition in the timing of time 52, the microcomputer 9 judges, based on the data from the ignition switch signal 3*a*, that the ignition switch 3 is turned OFF and controls the operation to instruct the ignition off timer section 21 to start the counter with the ignition off timer control signal 21*a* in the timing of time 53.

The ignition off timer section 21 controlled in the operation thereof starts count-up operation from the count value "1" and outputs the driver control signal 9*a* from the microcomputer 9 to the driver circuit 6 after changing the signal to the low level in the timing of time 54 in view of controlling the operation for turning OFF the relay contacts of the main relay 2 by changing the relay drive signal 6*a* from the driver circuit 6 to the low level condition. Thereby, the main relay 2 is cancelled in its drive and the primary voltage generating section 7 stops generation of the primary voltage 7*a*.

When the ignition switch 3 is turned ON again to start the microcomputer 9 in the timing of time 55 (within a week from the time 55), the microcomputer 9 changes the driver control signal 9*a* to the high level and outputs this signal to the driver circuit 6 in the timing of time 56, outputs also the relay drive signal 6*a* from the driver circuit 6 after changing this signal to the high level, and holds the counter value by suspending the counting operation of the ignition off timer section 21 with the ignition off timer control signal 21*a*. The microcomputer 9 reads a time interval between the times 53 and 56 during which the ignition switch 3 has been turned OFF and learns the life style of the driver (owner, user) based on various diagnostic functions and time data.

In addition, when the ignition switch 3 is turned OFF again in the timing of time 57 and the off time longer than one week has passed in the timing of time 59, the microcomputer 9 stops the count-up operation of the ignition off timer section 21 with the ignition off timer control signal 21*a* to control this section to hold the counter value.

Moreover, in the subsequent timings to times 61, 62 and 63 from the time 60, the operating processes explained above in regard to the timings to the times 56, 57, and 58 from the time 55 are repeated. The same explanation is omitted.

For example, if the battery voltage 1*a* is lowered during the counting operation of the ignition off timer section 21 because the ignition switch 3 is turned OFF as indicated in the timing of the subsequent time (period) 64, the counting-up operation is suspended by completely resetting the ignition off timer section 21 to the initial value "0" when the battery voltage 1*a* is recovered.

Figure 6:
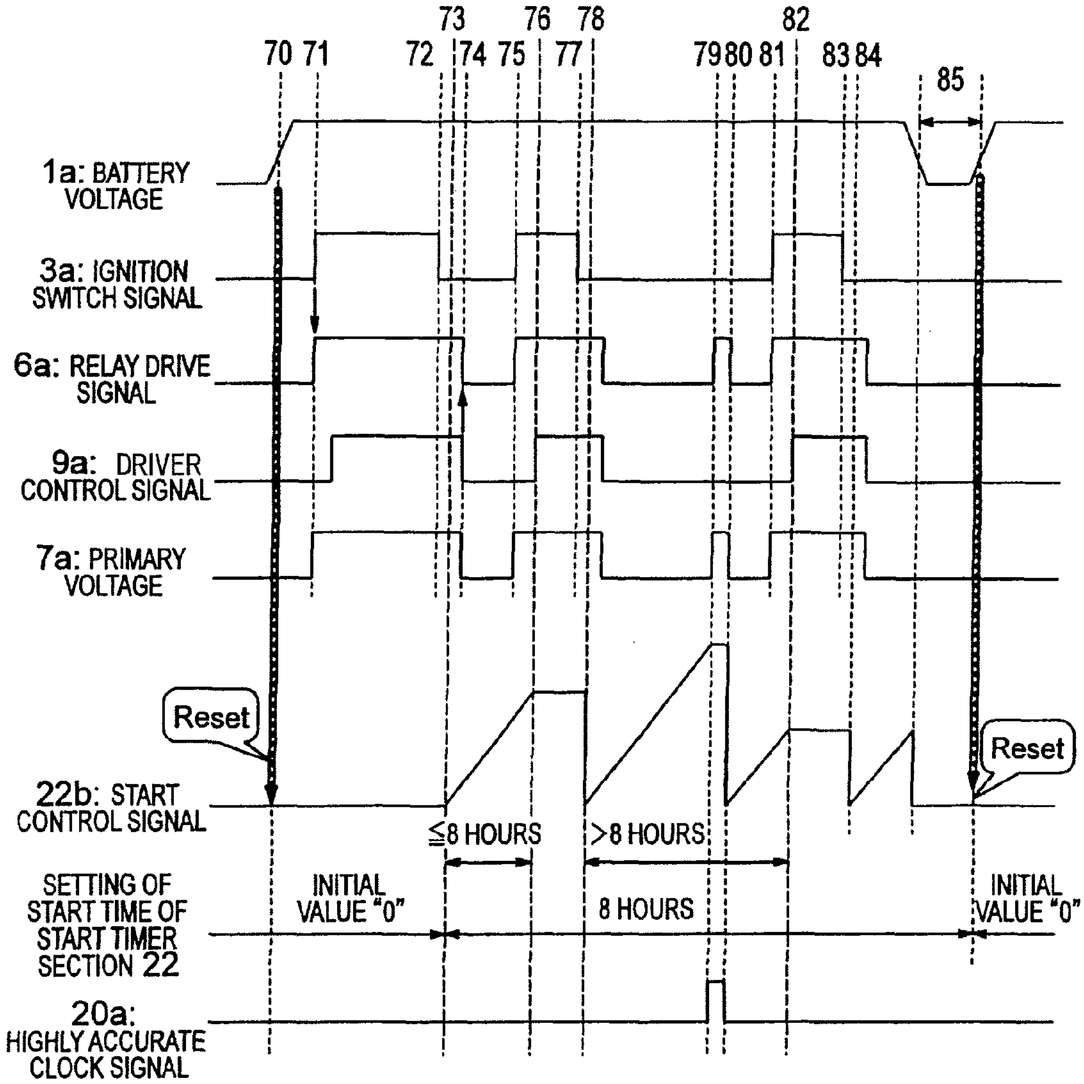
FIG. 6 is a timing chart of signal waveforms for signal processes for explaining operating function of an activation timer section provided in a clock control section of the power supply control unit explained in FIG. 4.

FIG. 6 is a timing chart of signal waveforms in relation to signal processes of each section for explaining operating functions of the start timer section 22 provided in the clock control section 5 of the power supply control unit 4A. In the example of FIG. 6, for the operating process of this start timer section 22, the setting value of start time from the microcomputer 9 is eight (8) hours and the setting value of stop time is two (2) seconds.

Here, when the battery 1 is connected and the battery voltage 1*a* is applied to the clock control section 5 in the timing of time 70, the start time of the start timer section 22 in the clock control section 5 is set to 0 hour, the stop time is set to 0 second, and the counter value is completely reset to the initial value "0".

When the ignition switch 3 is turned ON in the timing of time 71, the ignition switch signal 3*a* changes to the high level from low level. Simultaneously, the relay drive signal 6*a* of the driver circuit 6 changes to the high level to drive the main relay 3 by turning ON the relay contacts. As a result, the battery voltage 2*a* is applied to the primary voltage generating section 7 to generate the primary voltage 7*a*. Here, the secondary voltage 8*a* is generated from the primary voltage 7*a* generated by the secondary voltage generating section 8 and this secondary voltage 8*a* is applied to the microcomputer 9 and the other sections (including various sensors not shown in the figures) to start these sections.

The microcomputer 9 also controls the operation here to output the regulator control signal 9*a* to the driver circuit 6 after changing this signal to the high level and keep the ON condition of the relay contacts of the main relay 2 by changing the relay drive signal 6*a* from the driver circuit 6 to the high level in order to prevent occurrence of a failure when the primary voltage 7*a* is suspended due to operation of the ignition switch 3 during the operation processes.

When the ignition switch 3 is manipulated to the OFF condition in the timing of time 72, the microcomputer 9 judges that the ignition switch 3 is turned OFF based on the data of ignition switch signal 3*a* and controls, in the timing of time 73, operation of the start timer section 22 with the start timer control signal 22*a* to start the counting operation under the condition that the start time is set to eight (8) hours and to start the counting operation from the count value "1".

Moreover, the microcomputer 9 outputs the relay control signal 9*a*, after changing this signal to the low level, to the driver circuit 6 to change the relay drive signal 6*a* from the driver circuit 6 to the low level in the timing of time 74. Accordingly, drive of the main relay 2 is cancelled and generation of the primary voltage 7*a* by the primary voltage generating section 7 is stopped.

When the microcomputer 9 is started again with ON manipulation of the ignition switch 3 in the timing of time 75 (under eight (8) hours from the time 73), the microcomputer 9 outputs, in the timing of time 76, the driver control signal 9*a* to the driver circuit 6 after changing the signal to the high level, also outputs the relay drive signal 6*a* from the driver circuit 6 after changing the signal to the high level, and holds the counter value by suspending the counting operation of the start timer section 22 with the start timer control signal 22*a*. The start timer section 22 does not output the start control signal 22*b* for the driver circuit 6, because the timing (period) set between the times 73 and 76 does not reach eight (8) hours.

Moreover, when the ignition switch 3 is turned OFF again in the timing of time 77 and the counter value reaches eight (8) hours preset in the start timer section 22 in the timing of time 79 in which the off time has exceeded eight (8) hours, the start timer section 22 outputs the start control signal 22*b* that is changed to the high level to the driver circuit 6. Therefore, the driver circuit 6 changes the relay drive signal 6*a* to the high level to drive the main relay 2 and also applies the battery voltage 2*a* to the primary voltage generating section 7 to generate the primary voltage 7*a*. However, if the microcomputer 9 is not started normally here, it cannot output the driver control signal 9*a* in the high level. Accordingly, the microcomputer 9 outputs, in the timing of time 80, the start control signal 22*b* to the driver circuit 6 after changing this signal to the low level after two (2) seconds from the start time that is the preset stop time and also changes the relay drive signal 6*a* from the driver circuit 6 to the low level. As a result, the drive of main relay 2 is cancelled, and the start timer section 22 starts again the counting-up operation from the count value "1" suppress power consumption (current dissipation) of the battery 1*a*.

Moreover, in the timings of the subsequent times 82, 83, and 84 from the time 81, the operation processes explained for the timings of the times 76, 77, and 78 from the time 75 are repeated. The same explanation is omitted here.

For instance, if the battery voltage 1*a* is lowered during the counting operation of the start timer section 22 because the ignition switch 3 is turned OFF as shown in the subsequent timing of time (period) 85, the start time of the start timer section 22 is set to 0 hour, the stop time is set to 0 second, and the counter value is completely reset to the initial value "0", when the battery voltage 1*a* is recovered.

The power supply control device including various functions explained above can generate stable voltages by avoiding voltage change of the battery voltages 1*a* and 2*a* while the ignition switch 3 is turned ON and also can continue high precision clock generation even when the ignition switch 3 is turned OFF after reception of the highly accurate GPS clock from the GPS radio wave and the present time data of the standard radio wave. As a result, this power supply control circuit can activate various functions for management of measurements of the present time, occurring time and period of diagnosis and passage of off period of the ignition switch 3, start of the mounted devices for diagnosis when ignition off occurs, learning of life style of the vehicle driver (user), and detection of accurate time for charging control of the battery, etc.

An example of the structure of the power supply control device shown in FIG. 1 suggests direct control and read operation from the ports as a communication control method with the microcomputer 9. However, other communication methods such as SPI can also be applied for the microcomputer 9. Therefore, particular limitation is not applied here to the communication control method. In addition, the automatic correction of the present time data from the standard radio wave by the time management section 23 provided in the clock control section 5 has been explained above as the internal time correcting function of the power supply control unit 4A. However, since the present time signal 14*a* is transmitted to the microcomputer 9 in the clock control section 5, a method of correction control of the present time data after recognition thereof received from the microcomputer 9 is also applicable. Accordingly, no limitation is applied to the method of actualizing the time correcting function in this patent specification.

Second Embodiment

Figure 7:
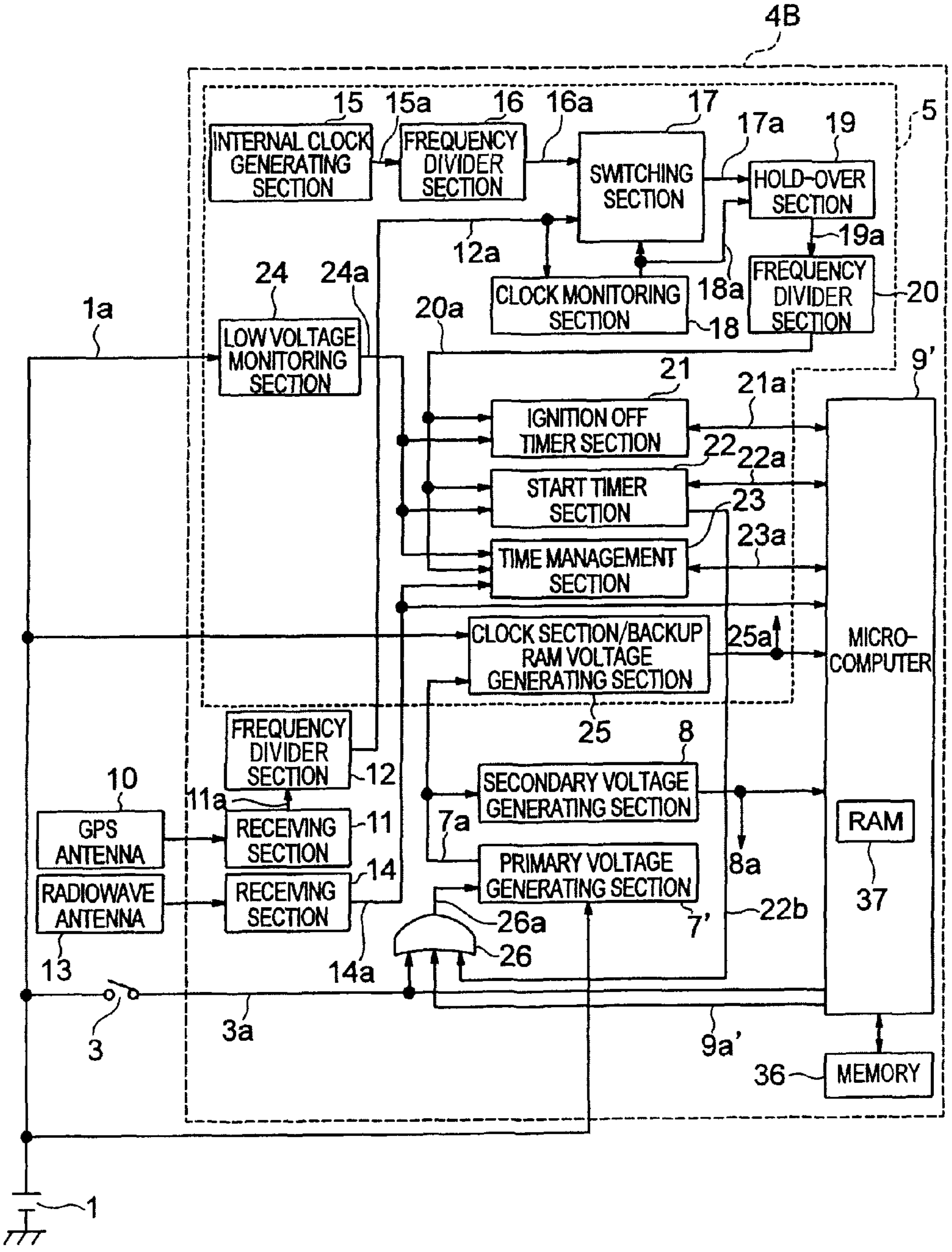
FIG. 7 is a circuit diagram showing a basic structure of the power supply control device as a second embodiment of the present invention.

FIG. 7 is a circuit diagram showing the basic structure of the power supply control device as the second embodiment of the present invention. However, in this power supply control device, the structural sections like that in the power supply control device of the first embodiment are designated with the like reference numerals. The second embodiment is explained mainly for the part different from the first embodiment.

In comparison with the device of the first embodiment, the power supply control device of the second embodiment does not use the main relay 2 and the driver circuit 6 which is used to drive the relay contacts of the main relay 2 provided in the power supply control unit 4A. In place of the structure explained above, the power supply control unit 4B is formed in the structure that the battery voltage 1*a* from the battery 1 is directly applied to the primary voltage generating section 7', and moreover, a regulator control circuit 26 is provided for generating the primary voltage 7*a* with the primary voltage generating section 7' by inputting the ignition switch signal 3*a*, a regulator driver control signal 9*a'* from the microcomputer 9, and a start control signal 22*b* and then outputting a regulator control signal (a primary voltage control signal) 26*a* in the high level condition to the primary voltage generating section 7' with the ON manipulation of the ignition switch 3.

Namely, the power supply control device of this second embodiment is provided with a functional structure to apply no battery voltage 2*a* by driving the main relay 2 with the ignition switch 3 and to generate the primary voltage 7*a* using only the battery voltage 1*a* from the battery 1 when the primary voltage generating section 7' inputs the regulator control signal 26*a* of the high level with the ON manipulation of the ignition switch 3 and each section other than that of this device is provided with the functional structure identical to that of the first embodiment. As the primary voltage generating section 7' in this second embodiment, the voltage boost/down conversion primary voltage generating circuit 7A shown in FIG. 2 and the voltage down conversion primary voltage generating circuit 7B shown in FIG. 3 can also be used. However, in this case, the battery voltage 1*a* is applied.

Third Embodiment

Figure 8:
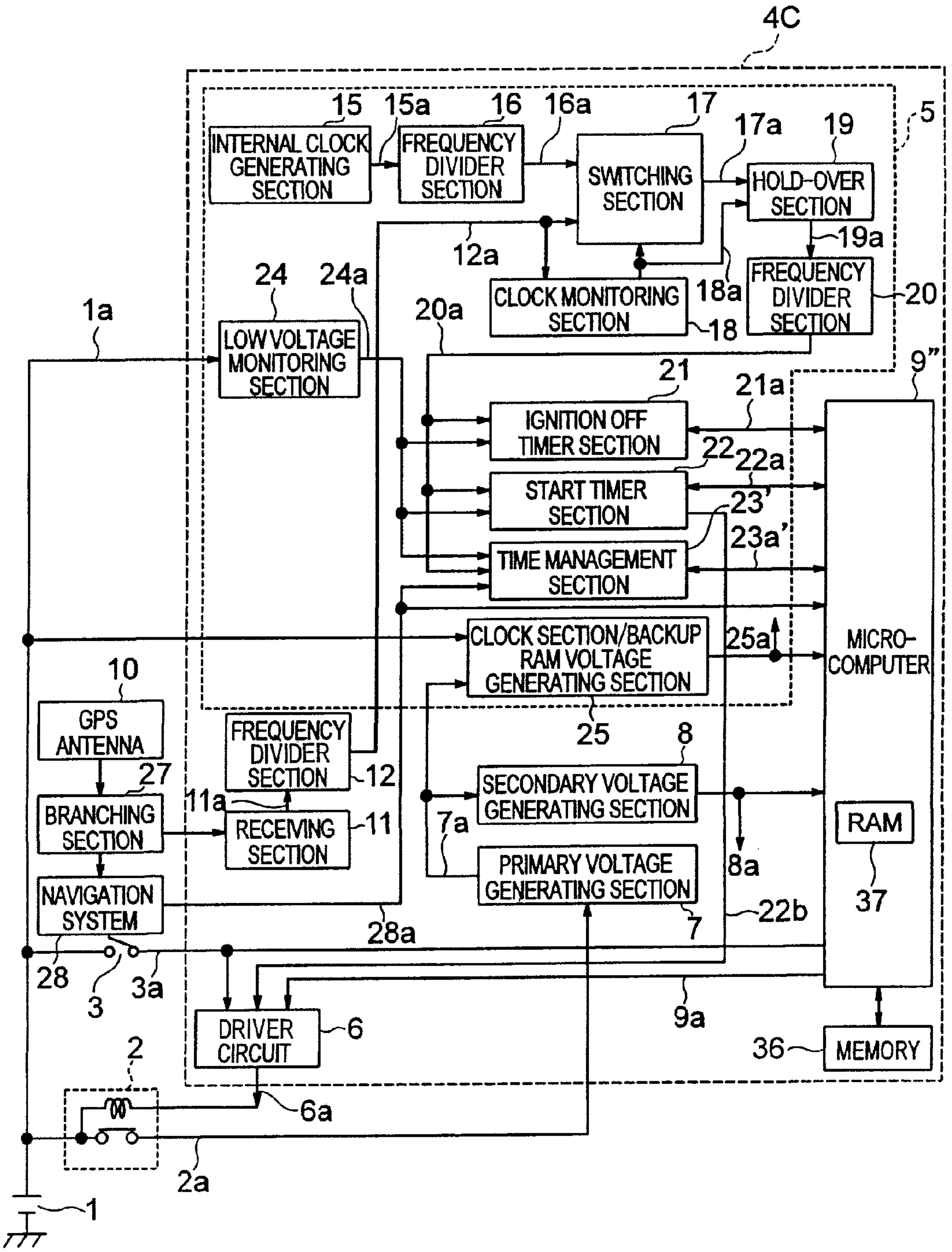
FIG. 8 is a circuit diagram showing a basic structure of the power supply control device as a third embodiment of the present invention.

FIG. 8 is a schematic circuit diagram showing a basic structure of the power supply control device as a third embodiment of the present invention. However, in the case of this power supply control device, the structural sections like that in the first embodiment explained above are also designated with the like reference numerals. The third embodiment will be explained mainly for the part different from the first embodiment.

In comparison with the device of the first embodiment, the power supply control device as the third embodiment does use the radio wave antenna 13 for receiving the standard radio wave including the present time data and the receiving section 14 provided within the power supply control unit 4A connected to the antenna. However, the device of the third embodiment uses a branching section 27 for branching the GPS radio wave from the GPS antenna 10 and is provided with a navigation system 28 for navigation in accordance with the branched GPS radio wave in order to provide a mechanical structure in the power supply control unit 4C to input a navigation signal 28*a* from the navigation system 28 to the time management section 23' of the clock control section 5 and to permit the microcomputer 9" to exchange a time control signal 23*a'* based on the navigation data with the time management section 23'.

In this power supply control device, the navigation system 28 outputs, upon receiving the GPS radio wave from the GPS antenna 10 transmitted via the branching section 27, the navigation signal 28*a* including the position data computed on the basis of the navigation data from each satellite and the world standard time data to the time management section 23'. The time management section 23' can manage the present time data and the time data obtained by correcting the present time data by identifying the area from the position data and processing the time difference data from the determined world standard time in regard to the world standard time data extracted with the navigation system 28. As a result, the functional structure identical to that provided with the radio wave antenna 10 and the receiving section 14 explained for the first embodiment can be constituted.

Here, an example of automatic correction of the present time data obtained from the navigation signal 28*a* based on the highly accurate clock signal 20*a* with the time management section 23' provided in the clock control section 5 has been explained above regarding the time correcting function. However, since it is also possible to apply the method of correction control after recognizing the present time data received by the microcomputer 9", no limitation is provided for the method of actualizing the time correcting function. In addition, it is additionally possible to apply the characteristic structural part of the power supply control device of the second embodiment to the power supply control device of the third embodiment. In this case, however, since the details which have been changed are already explained above, explanation of such details is omitted here.

In any device of the power supply control devices of respective embodiments, the voltage boost/down conversion primary voltage generating circuit 7A shown in FIG. 2 can be applied to the primary voltage generating sections 7, 7'. However, as the characteristic of this application, following advantages can be considered.

The voltage boost/down conversion primary voltage generating circuit 7A has the function to boost the battery voltages 1*a*, 2*a* if these voltages go down to the values under the primary voltage 7*a*, and keep these voltages to the predetermined voltage values. In such a case, the secondary voltage generating section 8 has the function to generate the secondary voltage 8*a* from a higher voltage value of the battery voltages 1*a*, 2*a* and the primary voltage 7*a*, and the primary voltage generating sections 7, 7' boost the battery voltages 1*a*, 2*a*, if these voltages are lowered to the values under the primary voltage 7*a*, and apply the primary voltage 7*a* to the secondary voltage generating section 8 by maintaining such primary voltage 7*a* at the predetermined voltage value. In addition, the reference voltage generating circuit 30 has the function to generate the reference voltage 30*a* from a higher voltage value of the battery voltages 1*a*, 2*a* and the primary voltage 7*a* and also has the function to maintain the reference voltage 30*a* at the predetermined voltage value even if the voltages 1*a*, 2*a* go down.

What is claimed is:

1. A power supply control device used in an electric control unit of electric equipment for a vehicle and including a voltage generating section that generates voltages used at least for a signal process for clocks required in electric devices included in the electric equipment for vehicles and a data process for backup storage from a battery voltage connected eternally, the power supply control device further comprising:

a reference voltage generating section as the voltage generating section that generates a reference voltage from the battery voltage supplied when an ignition switch is turned ON;

a primary voltage generating section as the voltage generating section that generates a primary voltage from the battery voltage;

a secondary voltage generating section as the voltage generating section that generates a secondary voltage from the primary voltage;

an internal clock generating section that generates an internal clock signal;

a GPS receiving section that receives a GPS radio wave;

a clock extracting section that extracts a GPS clock signal from the GPS radio wave;

a clock monitoring section that monitors the GPS clock signal;

a clock switching section that selects between the internal clock signal and the GPS clock signal;

a hold-over section that self-maintains clock accuracy of the selected signal of the internal clock signal and the GPS clock signal;

a time management section that measures and administrates the time;

a radio wave receiving section that receives a standard radio wave including a reference present time data;

an ignition key off time measuring section that measures ignition key off time; and a voltage application control section that applies the secondary voltage to the electric devices during a setting period of the ignition key off and stops application of the secondary voltage after passage of a stop period set after activation of the electric devices, wherein the time management section has a time correcting function to correct the present time data of the standard radio wave based on the clock accuracy self-maintained with the hold-over section.

2. The power supply control device according to claim 1, wherein the primary voltage generating section has a voltage boost/down function including a function to generate the primary voltage by down converter of the battery voltage and a function to generate the primary voltage by boost converter of the battery voltage.

3. The power supply control device according to claim 1, wherein the primary voltage generating section has a voltage down function to generate the primary voltage by down converter of the battery voltage.

4. The power supply control device according to claim 1, wherein the primary voltage generating section has a function to maintain, if the battery voltage goes down to a voltage lower than the primary voltage, the primary voltage at a predetermined voltage value by boosting the battery voltage.

5. The power supply control device as described in claim 1, further comprising a clock section/backup RAM voltage generating section to generate a clock section/backup RAM voltage generating section from a higher voltage value of the battery voltage and the primary voltage, wherein the primary voltage generating section maintains, if the battery voltage goes down to a voltage lower than the primary voltage, the primary voltage at a predetermined voltage value by boosting the battery voltage and then generates the clock section/backup RAM voltage.

6. The power supply control device according to claim 1, wherein the reference voltage generating section has a function to generate the reference voltage from a higher voltage value of the battery voltage and the primary voltage and also has a function to maintain the reference voltage at a predetermined voltage value if the battery voltage goes down.

7. The power supply control device according to claim 1, wherein the clock switching section selects, when a GPS clock signal is normal, the GPS clock signal and also selects, when the GPS clock signal is abnormal, the internal clock signal in accordance with a result of monitoring of the GPS clock signal by the clock monitoring section; and the hold-over section has a function to self-maintain clock accuracy of the GPS clock signal in the normal condition based on the internal clock signal selected by the clock switching section when the GPS clock signal can be detected under the condition that a failure is detected with the clock monitoring section after the GPS clock signal is locked with an internal phase locked loop circuit.

8. The power supply control device according to claim 1, comprising:

an ignition off timer section as the ignition key off time measuring section that measures a period until the time when the ignition switch is turned ON after it is turned OFF based on accuracy of clock from the hold-over section; and a start timer section used to start the electric devices after passage of preset time from the time when the ignition switch is turned OFF, wherein the ignition off timer section and the start timer section have a function to completely initialize counters to 0 when a battery mounted to a vehicle is connected.

9. The power supply control device according to claim 8, comprising a microcomputer for individually controlling the ignition off timer section and the start timer section, wherein the ignition off timer section and the start timer section have a function to make valid/invalid circuit operation with individual control from the microcomputer.

10. The power supply control device according to claim 9, wherein a functional diagnosis can be conducted to the time management section, ignition off timer section and start timer section under the control of the microcomputer.

11. The power supply control device according to claim 9, wherein the ignition off timer section and start timer section have a function to start counting operation from 1 when these sections are set effective under the control of microcomputer.

12. The power supply control device according to claim 11, wherein the start timer section has a function to start the primary voltage generating section after passage of start time, stop again the primary voltage generating section after passage of stopping time, and start again counting from 1 based on the setting of the start time and stopping time from the microcomputer.

13. The power supply control device according to claim 10, comprising a non-volatile memory connected to the microcomputer to electrically write and store functional diagnostic data of the time management section, ignition off timer section and start timer section, wherein the microcomputer is provided with a volatile memory for storing the functional diagnostic data together with the backup data and the functional diagnosis is activated when the microcomputer is started after passage of the preset time after the ignition switch is turned ON or OFF.

14. The power supply control device according to claim 13, wherein the microcomputer has functions:

to control the volatile memory and non-volatile memory to store vehicle producing time based on the present time data obtained from the time management section;

to conduct a time management diagnosis for storing the time data to the volatile memory and non-volatile memory;

to avoid deletion of data when the battery is replaced; and to compute a time difference between the present time and the vehicle producing time.

15. The power supply control device according to the claim 13, wherein the microcomputer has functions:

to control the volatile memory and non-volatile memory to store a usage condition of a vehicle driver based on the present time data from the time management section and a result of measurement by the ignition timer section; and to learn a life style of the driver by computing usage starting time and usage time of the vehicle.

16. The power supply control device according to claim 13, wherein the microcomputer has a function to control the volatile memory and non-volatile memory to store the data indicating occurrence of a failure in the circuit of the electric devices and in the loading condition of the device connected to the circuit and the time data based on the present time data from the time management section.

17. A power supply control device used in the electric control unit of electric equipment for a vehicle and including a voltage generating section that generates voltages used at least for a signal process for clocks required in electric devices included in the electric equipment for vehicles and data process for backup storage from a battery voltage connected eternally, the power supply control device further comprising:

a reference voltage generating section as the voltage generating section that generates a reference voltage from the battery voltage connected eternally;

a primary voltage generating section as the voltage generating section that generates a primary voltage during an ON period of an ignition switch based on the battery voltage connected;

a secondary voltage generating section as the voltage generating section that generates a secondary voltage from the primary voltage;

an internal clock generating section that generates an internal clock signal;

a GPS receiving section that receives a GPS radio wave;

a clock extracting section that extracts a GPS clock signal from the GPS radio wave; a clock monitoring section that monitors the GPS clock signal;

a clock switching section that selects between the internal clock signal and the GPS clock signal;

a hold-over section that self-maintains clock accuracy of the selected signal of the internal clock signal and the GPS clock signal;

a time management section that measures and administrates the time;

a radio wave receiving section that receives a standard radio wave including a reference present time data;

an ignition key off time measuring section that measures ignition key off time; and a voltage application control section that applies the secondary voltage to the electric devices during a setting period of the ignition key off and stops application of the secondary voltage after passage of a stop period set after activation of the electric devices, wherein the time management section has a time correcting function to correct the present time data of the standard radio wave based on the clock accuracy self-maintained with the hold-over section.

* * * * *